Mar. 27, 1923.
W. HOWARD ET AL
1,449,900
DIRECTION INDICATOR
Filed Apr. 12, 1922
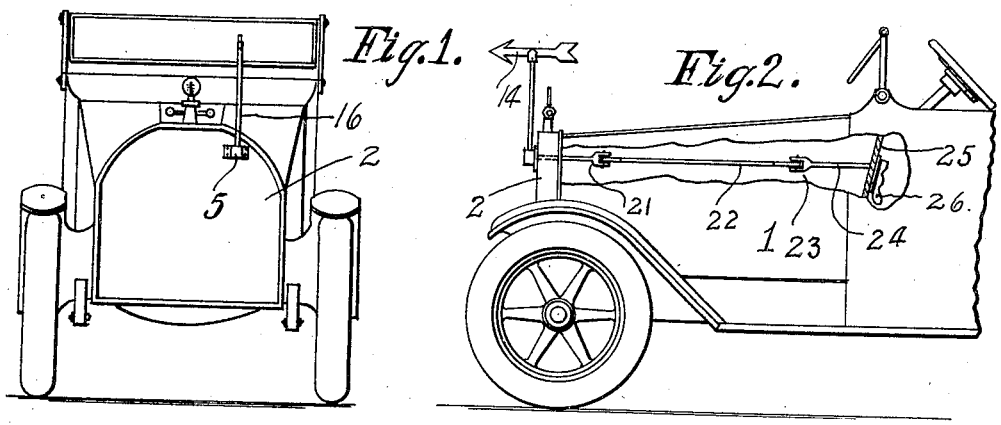
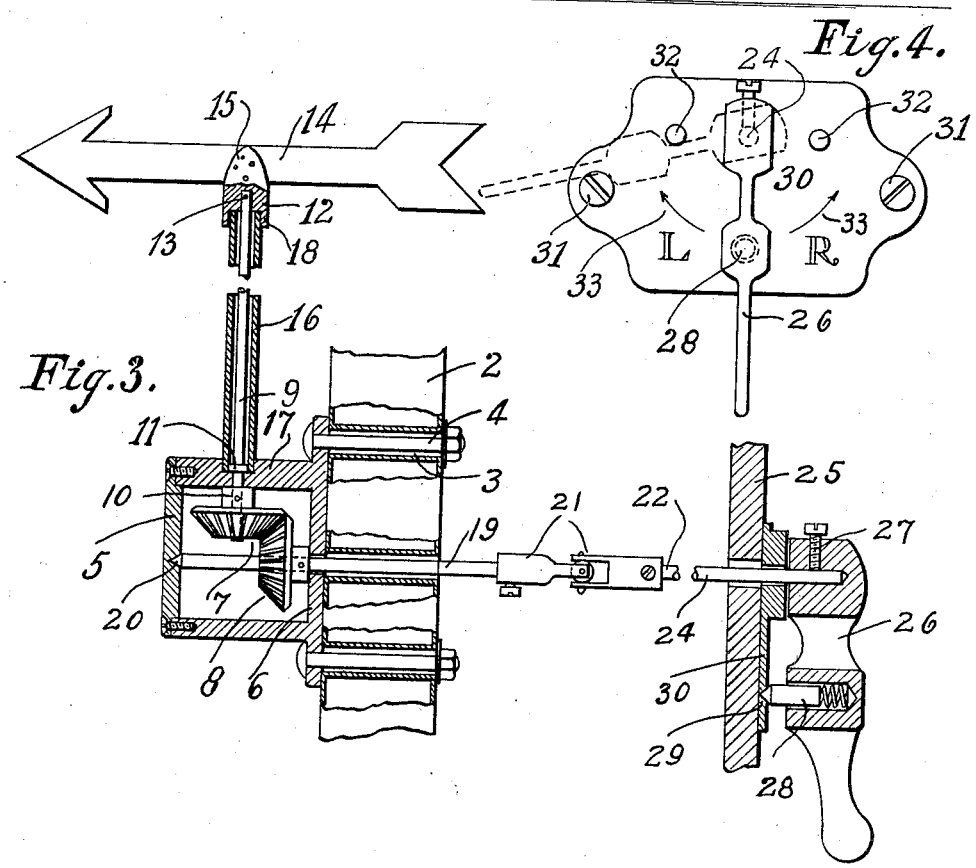
INVENTORS:
Walter Howard
Ernest J. Watson.
BY Harry W. Bowen.
ATTORNEY.

Patented Mar. 27, 1923.

1,449,900

UNITED STATES PATENT OFFICE.

WALTER HOWARD AND ERNEST J. WATSON, OF SPRINGFIELD, MASSACHUSETTS.

DIRECTION INDICATOR.

Application filed April 12, 1922. Serial No. 551,960.

*To all whom it may concern:*

Be it known that we, WALTER HOWARD and ERNEST J. WATSON, citizens of the United States of America, residing at Springfield, county of Hampden, State of Massachusetts, have invented certain new and useful Improvements in Direction Indicators, of which the following is a specification.

This invention relates to improvements in direction indicators for motor vehicles.

An object of the invention is to provide an indicating mechanism that is capable of being readily attached to the radiator of the vehicle without disturbing any of its construction.

A further object is to provide a device that will permit it to be installed at any lateral portion of the radiator and at the same time permit it to be operated from either the right or left hand portion of the seat, that is to say, to bring it into close relation with the operator.

A further object is to provide stop devices which will determine or limit the extent of movement of the indicator.

Referring to the drawings:

Fig. 1 is a front elevational view of a motor vehicle showing the indicator device attached to the outer or front end of the radiator.

Fig. 2 is a side elevational view partially in section of the hood portion of the vehicle showing the indicator device installed and the operating shaft therefor and provided with two universal joints.

Fig. 3 is a detail view on a large scale of the indicator mechanism showing the same attached to the radiator also the lever for moving the indicator and retaining it in its adjusted positions, and Fig. 4 is an elevational view of the locking plate and lever.

Referring to the drawings in detail:

1 designates the hood portion of the vehicle. 2 the radiator porton having the cellular openings 3 through which passes the bolts 4 for attaching the device to the radiator. The device comprises a box or casing member 5 formed with a plate portion 6 through which the bolts 4 passes. In this casing member is located the bevel gears 7 and 8. The gear 7 being connected to the vertical shaft 9 by means of the pin 10. 11 designates a collar on the shaft 9 for retaining the shaft and gear in its vertical position. The upper end of the shaft 9 is pinned to a hub portion 12 indicated at 13. 14 designates the arrow member which is attached to the hub portion 13 by means of the rivets 15. The shaft 9 is encased within a tubular member 16 the lower end of which is fitted into a socket portion of the upper plate 17 of the casing 5. The hub member 13 is formed with a downwardly extending flange portion 18 and engages the outer upper end of the tubular member 16, whereby the open upper end of this tubular member is protected against the entrance of water.

The gear 9 is secured to the shaft 19 which shaft passes through one of the air passages in the radiator as shown. The outer end of the shaft is provided with a bearing in the plate 20 of the casing 5. The inner end of the shaft is provided with a universal joint construction indicated as a whole by the numeral 21 and connected to this universal joint is a second length of shaft 22 which is also connected to the universal joint 23. 24 designates the length of shaft which extends into the compartment back of the cowl or instrument board which is indicated at 25 and is in close relation to the operator. Attached to the inner end of the shaft 24 is an operating lever 26 by means of the set screw 27. 28 is a spring actuated pin or pawl designed to hold the indicator mechanism in its central or normal position of adjustment. This pawl enters a recess 29 in plate 30 which is attached to the pawl 28 by means of the screws 31. 32 indicates stops or pins which project inward of the plate 30 and against which the lever 26 strikes when it is thrown either to the right or left hand as indicated by the arrows 33. When the lever 26 is thrown the arrow is simultaneously operated either towards the right hand or left hand. The lever is moved until it engages one of the pins or stops 32 then the operator swings the lever back to its neutral or central position.

One of the advantages of the present mechanism is that by the use of the universal joints the device may be attached at any portion of the radiator that is to say either at the right or left hand side which will permit the shaft to be carried diagonally under the hood and into the position which is occupied by the driver of the car, that is to say that if the indicator mechanism is at the right hand side of the hood and the driver sits on the left hand side the device may be readily moved.

Another advantage is that it may be readily connected to the motor vehicle at the front end of the radiator as shown without disturbing or mutilating the car in any way, the attaching means being bolts 4 which pass through the air passages of the radiator.

From this description it may be seen that we have produced a direction indicator mechanism that may be readily attached to any motor vehicle and one that may be produced at little expense and which is efficient.

What we claim is:

1. In a direction indicator, for the purpose described, of a casing member designed to be attached to the outer front end of the radiator of the motor vehicle, gears within the casing, a shaft to which the indicator member is connected and operable from the gears, a second shaft to which the gears are connected operable from the seat of the driver, said second shaft being provided with a plurality of universal joints, whereby the position of the inclosing casing with reference to the outer front end of the radiator may be varied, means including a lever attached to the second shaft for operating the same from the seat of the driver and means maintaining the indicator in its normal or neutral position comprising a spring actuated stop pin and a plate having recesses therein for receiving the pin.

2. In a device for the purpose described, the combination of an enclosing casing, bevel gears therein, a vertically arranged tubular member mounted thereon, a shaft secured to one of the gears and extending through said member, a pointer connected to the upper end of the shaft, the pointer connecting means being formed with a downwardly extending flange for engaging and extending over the upper outer surface of the tubular member, means for operating the shaft of the pointer, connecting means from the other bevel gear, means for securing the enclosing casing member to the outer front surface of the radiator by means of bolts passing through the air passages of the radiator, and means for operating said other bevel gear comprising a shaft extending from the casing to the operator, said shaft having a plurality of universal joints thereon and spring devices for retaining the shaft in different positions.

3. In a direction indicator, the combination of an inclosing casing designed to be attached to the outer front surface of the radiator of a motor vehicle, a direction pointer mounted on the casing, an operating shaft extending from the casing to the operator of the vehicle, a plurality of universal joints in the shaft, means for operating the shaft comprising a lever attached to the shaft, stop pins for limiting the extent of movement of the lever and a spring actuated pin for engaging a recess for retaining the indicator in its neutral or forward pointing position.

WALTER HOWARD.
ERNEST J. WATSON.